No. 702,539. Patented June 17, 1902.
F. K. CHRISTENSEN.
VEHICLE TIRE.
(Application filed Apr. 7, 1902.)
(No Model.)
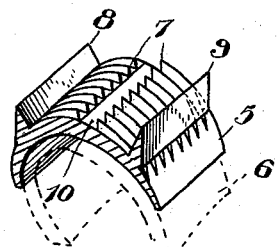
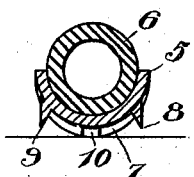
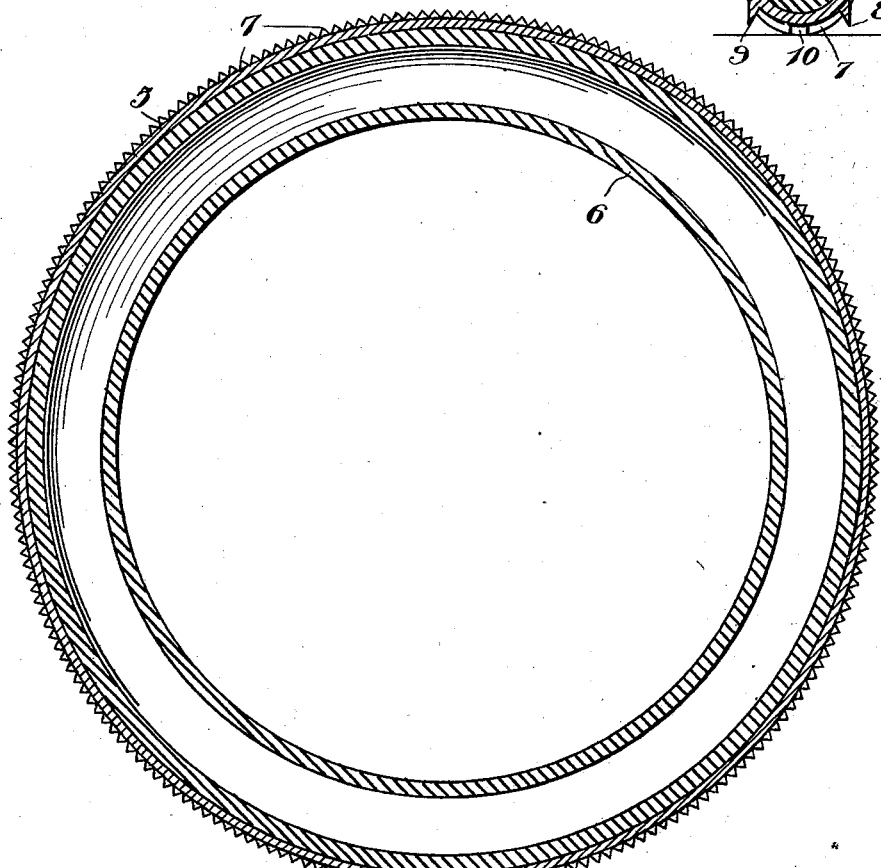
Witnesses
T. P. Brett
F. E. Dimmick
Inventor
F. K. Christensen,
By Chandler & Chandler
Attorneys
THE NORRIS PETERS CO., PHOTO-LITHO., WASHINGTON, D. C.

UNITED STATES PATENT OFFICE.

FREDERICK K. CHRISTENSEN, OF SANDY, UTAH.

VEHICLE-TIRE.

SPECIFICATION forming part of Letters Patent No. 702,539, dated June 17, 1902.

Application filed April 7, 1902. Serial No. 101,729. (No model.)

*To all whom it may concern:*

Be it known that I, FREDERICK K. CHRISTENSEN, a citizen of the United States, residing at Sandy, in the county of Salt Lake, State of Utah, have invented certain new and useful Improvements in Vehicle-Tires; and I do hereby declare the following to be a full, clear, and exact description of the invention, such as will enable others skilled in the art to which it appertains to make and use the same.

This invention relates to vehicle-tires; and it has for its object to provide a tire of that class known as "armored" tires the construction of which will be such as to prevent puncture of the air-tube and which also will prevent slipping of the tire both laterally and circumferentially.

Other objects and advantages of the invention will be understood from the following description.

In the drawings forming a portion of this specification, and in which like numerals of reference indicate similar parts in the several views, Figure 1 is a perspective view showing a section of the armor. Fig. 2 is a section through a tire in a plane at right angles to the axis thereof. Fig. 3 is a section transversely through a tire embodying the present invention.

Referring now to the drawings, the armor of the present tire consists of a continuous band 5, which is transversely arc-shaped and disposed upon the air-tube 6, of rubber or other similar material. The band 5 is provided upon its outer or convex face with a plurality of ribs 7, which extend transversely of the band and decrease gradually in height from the central line of the band in the direction of the side edges thereof. The central portion of each of the ribs has a knife-edge, while the end portions of the ribs are flattened, as illustrated.

Spaced laterally from the center line of the band 5 and against the outer face thereof are secured or formed the longitudinal ribs 8 and 9, extending circumferentially of the band, the edges of these ribs being sharpened and lying below the line connecting the central points of the edges of the transverse ribs, so that the longitudinal or circumferential ribs do not touch the ground when the tire stands in a vertical plane. With this construction it will be seen that the transverse ribs will give the required friction to prevent slipping of a drive-wheel circumferentially, while when the wheel is tilted, as when turning, either of the circumferential ribs will come in contact with the ground, depending upon the direction in which the wheel is tilted, and lateral slipping of the wheel will be prevented.

In the central portion of each of the transverse ribs is formed a groove 10, the grooves of the several ribs of the band being in alinement circumferentially of the tire.

What is claimed is—

In a tire, the combination with the air-tube, of an armor secured thereto, said armor having transverse ribs having alining slots through their central portions, and circumferential ribs spaced laterally from the central line of the tire, the circumferential ribs projecting beyond the transverse ribs at the points upon the armor at which they lie and lying inwardly of the tire from the middle portions of the transverse ribs.

In testimony whereof I affix my signature in presence of two witnesses.

FREDERICK K. CHRISTENSEN.

Witnesses:
B. C. WARD,
EMIL HARTVIKSEN.